(12) United States Patent
Patel et al.

(10) Patent No.: US 8,935,726 B2
(45) Date of Patent: Jan. 13, 2015

(54) GENERATION OF DYNAMIC CONTENT INTERFACES

(75) Inventors: Mehul Patel, Denver, CO (US); Edward David Monnerat, Parker, CO (US); Andrew R. Young, Glenmoore, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 13/469,860

(22) Filed: May 11, 2012

(65) Prior Publication Data

US 2013/0305289 A1    Nov. 14, 2013

(51) Int. Cl.
*H04N 5/445* (2011.01)
*G06F 3/00* (2006.01)
*G06F 13/00* (2006.01)

(52) U.S. Cl.
USPC ............... 725/44; 725/37; 725/38; 725/39; 725/46; 725/47; 725/56; 725/57

(58) Field of Classification Search
USPC .......... 725/37–39, 44, 46, 47, 56, 57
See application file for complete search history.

(56) References Cited

U.S. PATENT DOCUMENTS

| | | | |
|---|---|---|---|
| 5,461,427 A | 10/1995 | Duffield et al. | |
| 5,576,769 A | 11/1996 | Lendaro | |
| 6,108,044 A | 8/2000 | Shin | |
| 6,359,580 B1 | 3/2002 | Morrison | |
| 6,594,825 B1 | 7/2003 | Goldschmidt Iki et al. | |
| 6,772,433 B1 | 8/2004 | LaJoie et al. | |
| 7,061,542 B1 | 6/2006 | Ikeguchi | |
| 7,209,874 B2 | 4/2007 | Salmonsen | |
| 7,551,229 B2 | 6/2009 | Ozaki et al. | |
| 7,567,565 B2 | 7/2009 | La Joie | |
| 7,924,451 B2 | 4/2011 | Hirooka | |
| 8,166,504 B2 * | 4/2012 | Kang et al. | 725/48 |
| 2001/0019365 A1 | 9/2001 | Kim et al. | |
| 2002/0009289 A1 | 1/2002 | Morishita et al. | |
| 2002/0076194 A1 | 6/2002 | Watanabe | |
| 2002/0145611 A1 | 10/2002 | Dye et al. | |
| 2005/0044566 A1 * | 2/2005 | Jerding et al. | 725/37 |
| 2005/0180858 A1 | 8/2005 | Halgas | |

(Continued)

FOREIGN PATENT DOCUMENTS

| | | |
|---|---|---|
| WO | 2005/125200 A2 | 12/2005 |
| WO | 2007/078503 A2 | 7/2007 |
| WO | 09/118041 A1 | 10/2009 |

OTHER PUBLICATIONS

Data-Over-Cable Service Interface Specifications, eDOCSIS™ Specification, CM-SP-eDOCSISI18-090529, Copyright 2003—2009 Cable Television Laboratories, Inc., 72 pages.

(Continued)

*Primary Examiner* — Nasser Goodarzi
*Assistant Examiner* — Fred Peng
(74) *Attorney, Agent, or Firm* — Banner & Witcoff, Ltd.

(57) ABSTRACT

Example embodiments relate to generation of dynamic content interfaces based on device capabilities and user entitlements. Multiple devices associated with a user account may each request a content interface. Generation of the content interfaces may be based on capability information of the devices and a tier entitlement associated with the user account. A service included in both the content interfaces may be assigned a same virtual channel in each of the content interfaces.

20 Claims, 4 Drawing Sheets

(56) References Cited

U.S. PATENT DOCUMENTS

| | | |
|---|---|---|
| 2005/0213938 A1 | 9/2005 | Ozawa et al. |
| 2006/0005223 A1 | 1/2006 | Weng et al. |
| 2006/0061682 A1 | 3/2006 | Bradley et al. |
| 2006/0133775 A1 | 6/2006 | Ju |
| 2006/0184992 A1 | 8/2006 | Kortum et al. |
| 2006/0188235 A1 | 8/2006 | Umei et al. |
| 2006/0274203 A1 | 12/2006 | Naganuma et al. |
| 2007/0101370 A1 | 5/2007 | Calderwood |
| 2007/0157260 A1 | 7/2007 | Walker |
| 2007/0223870 A1 | 9/2007 | Farling et al. |
| 2008/0034391 A1 | 2/2008 | Lehman et al. |
| 2008/0141303 A1 | 6/2008 | Walker et al. |
| 2008/0195466 A1 | 8/2008 | Wright |
| 2008/0301749 A1 | 12/2008 | Harrar et al. |
| 2008/0307485 A1 | 12/2008 | Clement et al. |
| 2009/0031335 A1 | 1/2009 | Hendricks et al. |
| 2009/0031384 A1 | 1/2009 | Brooks et al. |
| 2009/0150958 A1 | 6/2009 | Jerding et al. |
| 2009/0190028 A1 | 7/2009 | Rodriguez et al. |
| 2009/0262136 A1 | 10/2009 | Tischer et al. |
| 2010/0054712 A1 | 3/2010 | Wollmershauser et al. |
| 2010/0150531 A1 | 6/2010 | Corry et al. |
| 2010/0162292 A1 | 6/2010 | Potrebic et al. |
| 2011/0102675 A1 | 5/2011 | Jackson |
| 2011/0102683 A1 | 5/2011 | Josephs |
| 2011/0258665 A1* | 10/2011 | Fahrny et al. .................. 725/47 |
| 2012/0072954 A1* | 3/2012 | Karaoguz et al. ............... 725/56 |
| 2012/0084814 A1* | 4/2012 | Olague et al. .................. 725/39 |
| 2012/0102535 A1* | 4/2012 | Weintraub et al. ............ 725/110 |

OTHER PUBLICATIONS

International Search Report and Written Opinion for PCT/US2011/032463, mailed Jul. 15, 2011.

O'Donnell, White Paper, HDMI™: The Digital Display Link, Dec. 2006, 21 pages.

Extended European Search Report—EP 11769576.7—Mailing Date: Sep. 20, 2013.

* cited by examiner

GENERATION OF DYNAMIC CONTENT INTERFACES

BACKGROUND

Known implementations of content interfaces, such as channel maps, have shortcomings. For example, such interfaces may fail to account for variations in device system parameters such as entitlements. For example, a particular user may not be entitled to premium channel access in a network. However, because multiple channel maps may be maintained, inefficiencies further increase. The following disclosure identifies and provides solutions for implementations of content interfaces.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

The disclosure relates to a system, device, computer readable media, and method to dynamically generate content interfaces based on device capabilities and user entitlements. Aspects of the disclosure may be provided in one or more computer-readable medium having computer-executable instructions that, when executed by at least one processor, cause a computer, user terminal, or other apparatus to at least perform one or more of the processes described herein. The computer-readable medium may be a memory and/or may be non-transitory.

In some aspects, a first request for a first dynamic content interface received from a first device and a second request for a second dynamic content interface received from a second device may be processed, wherein the first and second devices are associated with a user account. The first dynamic content interface may be generated based on first capability information included in the first dynamic content interface request and a tier entitlement associated with the user account. The second dynamic content interface may be generated based on second capability information included in the second dynamic content interface request and the tier entitlement associated with the user account, wherein a service identified in both the first and second dynamic content interfaces is assigned a same virtual channel in each of the content interfaces.

BRIEF DESCRIPTION OF THE DRAWINGS

Understanding of the disclosure may be facilitated by consideration of the following detailed description of the embodiments, taken in conjunction with the accompanying drawings, in which like numerals refer to like parts and in which.

DETAILED DESCRIPTION

It is to be understood that the figures and descriptions have been simplified to illustrate elements that are relevant for a clear understanding, while eliminating, for the purpose of brevity, many other elements found in typical communication devices, systems and methodologies. Those of ordinary skill in the art will thus recognize that other elements and/or steps are desirable and/or may be included. However, because such elements and steps are well known in the art, a discussion of such elements and steps is not provided herein. Furthermore, the embodiments identified and illustrated herein are for exemplary purposes only, and are not meant to be exclusive or limited in their description.

Figure 1:
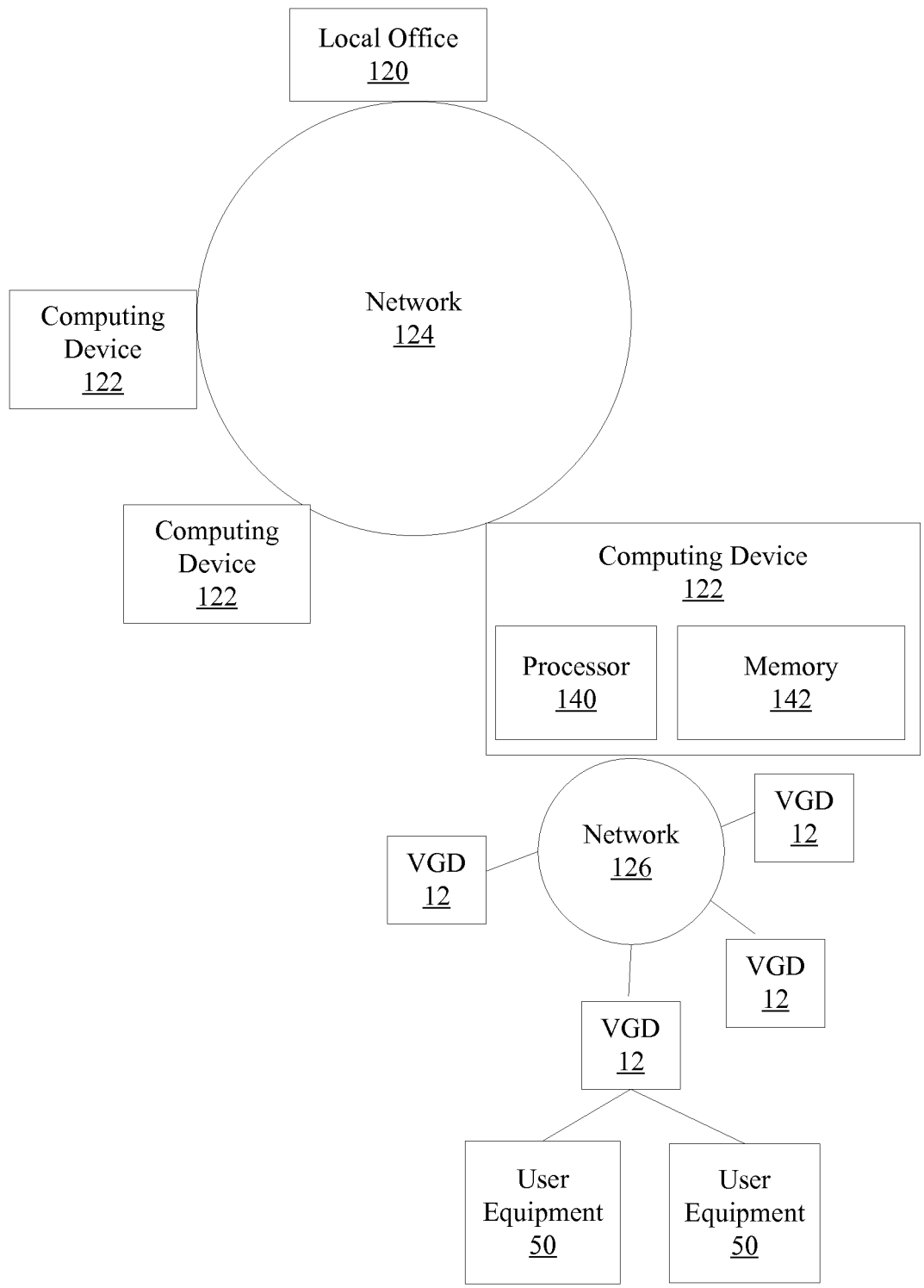
FIG. 1 is a block diagram that illustrates an example system, in accordance with various aspects of the disclosure.

FIG. 1 is a block diagram that illustrates an example system for providing dynamic content interfaces, in accordance with various aspects of the disclosure. A content interface may provide a computing device with information to enable access to a service. In an example, a content interface may be a channel map or a content map. Content interface may also list services that may be accessed by a content device by manners instead of or in addition to channels. Services may include access to applications, documents, games, video programs, audio programs, other types of content, and combinations thereof. Services may be available for free or for a fee. Local Office 120 (e.g., headend) and one or more computing devices 122 may be directly or indirectly associated with a network 124 (e.g., provider or Multiple System Operator (MSO) network). In an example, a computing device 122 may be a server. Local Office 120 may include a master facility, under the control of a provider, such as the MSO, for receiving content, such as, for example, television video programs, for processing and distribution over network 124. Network 124 may allow for distribution of content and data, from Local Office 120 to one or more computing devices 122. The one or more computing devices 122 may be and/or include one or more servers, relays, and the like, such as one or more provider edge servers. An edge server may be a bi-directional communication server that may include storage, such as a cache, for storing frequently requested data. The computing devices 122 may distribute content to one or more local video generation devices (VGDs) 12 via a network 126.

VGD 12 may present content (e.g., video, audio) to a user received from the Local Office 120 or other content source, or may be coupled to another video display device, such as, for example, user equipment 50 for presenting the content. VGD 12 may be, for example, a display, a television set, a mobile phone, a set top box, computer, or other device capable of audiovisual presentation. User equipment 50 may be, for example, a display, a television set, computer monitor, a mobile device, and the like. In an example, VGD 12 may include an embedded cable modem (eCM) operable using the "Data-Over-Cable Service Interface Specifications, e-DOCSIS™ Specification, CM-SP-eDOCSIS-I18-090529," the contents of which are herein incorporated by reference in their entirety. An eCM may perform a network entry, or "provisioning," process in accordance with the e-DOCSIS specification to obtain a network configuration, the time and date, download a DOCSIS configuration file, and registering and completing DOCSIS network entry. Further, although the examples discussed in this disclosure include video content delivery, those skilled in the art will appreciate, in light of the disclosure, that the examples discussed herein may additionally be applicable to content delivery systems generally.

Each of devices 12, 50, 120, and 122 may include at least one processor and may include one or more computer readable media storing computer executable instructions that, when executed, cause one or more of the devices 12, 50, 120, and 122 to perform the operations described herein. For example, FIG. 1 illustrates a computing device 122 including a processor 140 and computer readable media 142. Each depicted device in FIG. 1, as well as in the other figures, may also include a processor 140 and computer readable media embodied as memory 142. In an example, computer readable media may be tangible and may be non-transitory. Computer readable media may be any available media that may be accessed by a computing device 122 (e.g., server) and include both volatile and nonvolatile media, removable and non-removable media. Computer storage media include, but is not limited to, a hard drive, a flash drive, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by a computing device.

Figure 2:
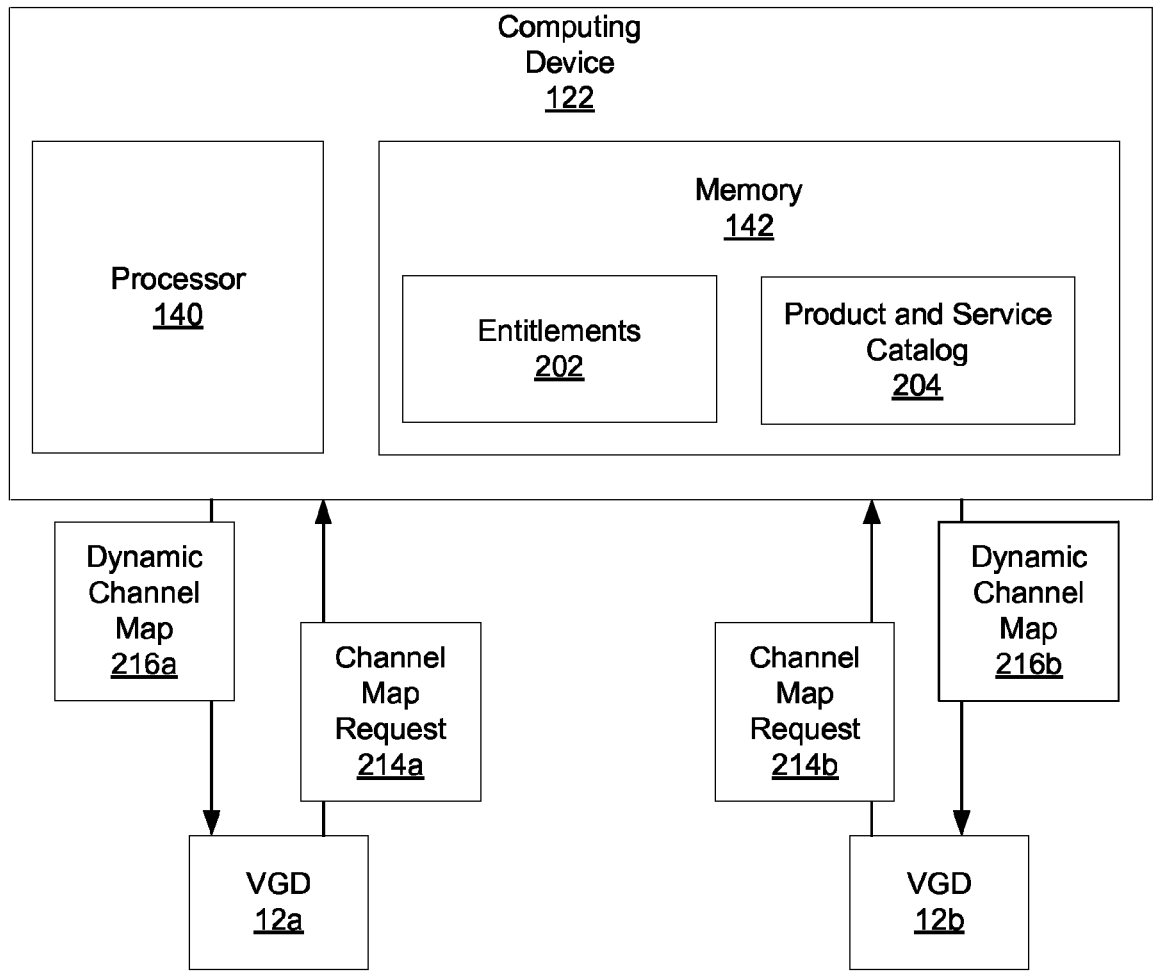
FIG. 2 is a block diagram that illustrates example aspects of interaction between computing devices, in accordance with various aspects of the disclosure.
Figure 3:
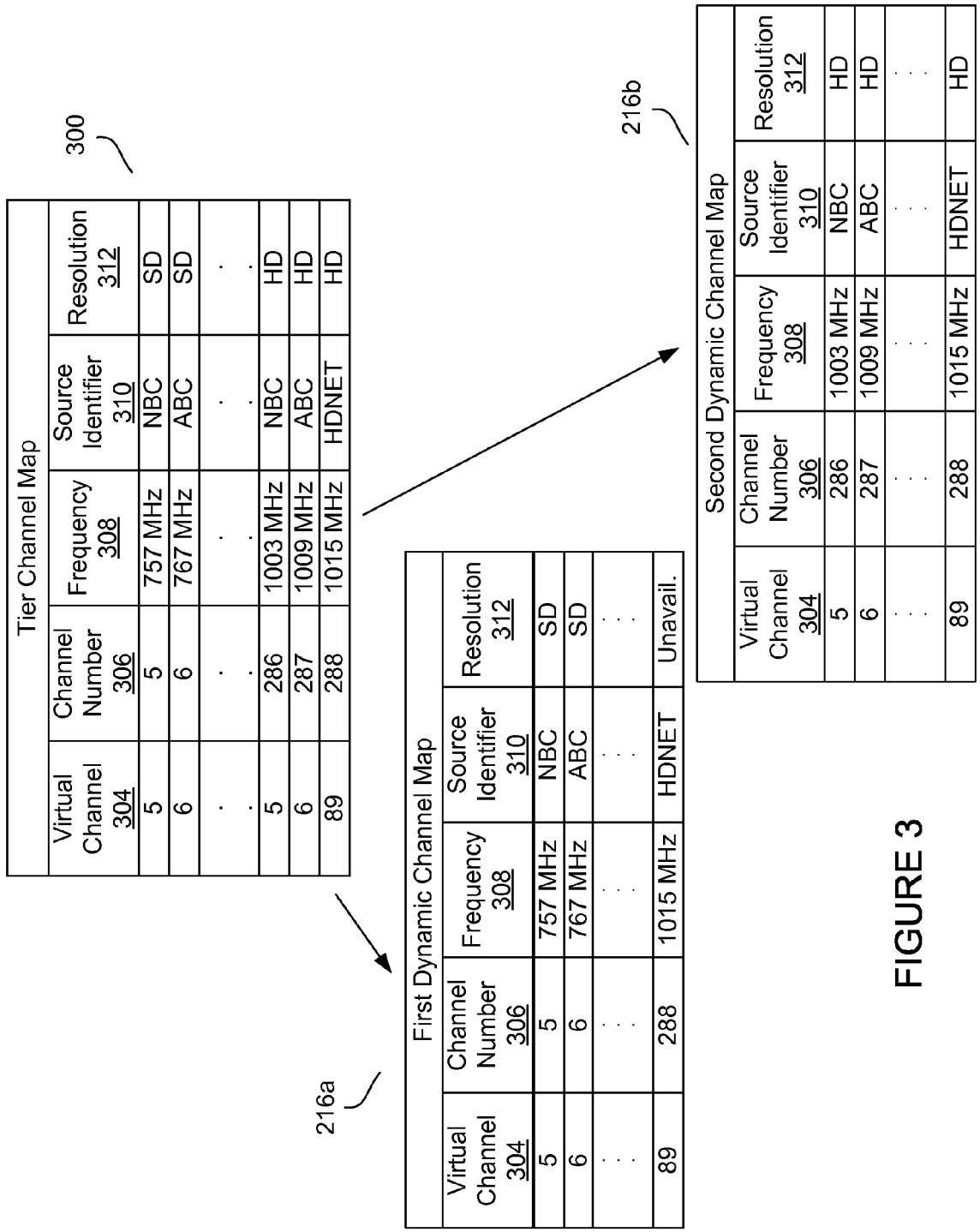
FIG. 3 illustrates examples of content interfaces, in accordance with various aspects of the disclosure.

FIG. 2 is a block diagram that illustrates example aspects of interaction between a computing device 122 and video generation devices 12a-b, and FIG. 3 illustrates examples of a tier channel map 300 and dynamic channel maps 216, in accordance with various aspects of the disclosure. Initially, a user may sign up with a service provider to access certain services. For example, a user may sign up for services providing access to one or more of video programs, audio programs, data, applications, games, documents, telephone services, or other network-based services. In an example, a service provider may provide different tiers of services that a user can select to purchase. For instance, a tier may correspond to a set of television channels, where content on a particular channel is provided by a particular content creator (e.g., channel 5 for HBO®). In an example, a first tier may be a basic tier providing access a first predetermined set of television channels, a second tier may be an expanded tier providing access to a second predetermined set of television channels, and a third tier may provide a user with a la carte selection of which channels to include. Any number of tiers may be used, and one or more channels may be included in multiple tiers or may be unique to a particular tier. Tiers may also list one or more games, applications, documents, or other content items to which a subscribing user may access.

To obtain access to a particular tier, the user may electronically subscribe using their VGD 12 by communicating a request to the computing device 122 identifying a particular tier, or by contacting a customer service representative. Once a particular tier has been ordered, the computing device 122 may receive and store information on tier entitlement 202 in memory 142 (e.g., a database), for this user identifying the tier to which the user has subscribed. In an example, computing device 122 may establish an account in memory 142 for a user specifying to which tier of entitlements a user has subscribed. Entitlements may include channel entitlements, program entitlements, authorizations, application entitlements, document entitlements, game entitlements, and the like, for example. Memory 142 may also store entitlements for other users served by the computing device 122. Memory 142 may store a product and service catalog 204 listing available products and services that can be provided to a user, as well as sources for the products and services.

In an example, catalog 204 may list sources for each service. For example, a particular service may be available from one or more SD video sources, HD video sources, or wireless access protocol (WAP) sources or similar mobile video sources. Memory 142 may include, for example, a relational database relating a particular service with multiple sources for that service, such as by type, by market, by geography, or by other factors.

For each tier, computing device 122 may maintain a tier channel map 300. With reference to FIG. 3, the tier channel map 300 may provide information on the services available in that tier. The tier channel map 300 may be a lineup of services available to users and may include analog and digital channel data. In an example shown in FIG. 3, tier channel map 300 may include a virtual channel column 304, a channel number column 306, a frequency column 308, a source identifier column 310, and a resolution column 312. The virtual channel column 304 may list a virtual channel of a service, rather than an actual channel on which a VGD 12 receives the service. In an example, a user may access content using different VGDs 12, where a first VGD may access a version of content in an HD format and a second VGD may access a version of the content in an SD format. Virtual channels may be used so that a user may receive content from a source on the same virtual channel, regardless of which channel a VGD 12 is actually being used to access the content. As seen in tier channel map 300, the virtual channel for both SD and HD channels of NBC is the same (e.g., virtual channel 5), even though the SD channel is transmitted at frequency 757 MHz and the HD channel is transmitted at frequency 1003 MHz. Similarly, first and second dynamic channel maps 216a-b identify a same virtual channel for both SD and HD channels of NBC. In a further example, the virtual channel for both SD and HD channels of NBC may be the same (e.g., virtual channel 5), even though the SD channel is transmitted at frequency 757 MHz and the HD channel is provided to the VGD via a data stream. Use of virtual channels may provide, for example, the user with a consistent experience regardless of whether they are viewing a service in their home using a set top box, or on the go using a mobile phone.

With reference to the tier channel map 300 in FIG. 3, the channel number column 306 may identify a particular frequency band on which a channel is transmitted. Examples of transmission may include broadcasting and unicasting. The frequency column 308 may identify a frequency corresponding to a particular channel number. Instead of or in addition to identifying a frequency, the tier channel map 300 may identify a network address of a device providing a data stream (e.g., MPEG stream) of the content. For example, VGD 12 may use the network address to access a data stream providing an application, a game, a document, or other content item. The source identifier column 310 may identify a creator of content transmitted on a particular channel or data stream. The resolution column 312 may identify the resolution of programming being transmitted on a particular channel. For example, a resolution of a program may be one or more of SD multicast, HD multicast, and low bandwidth multicast.

Tier channel map 300 may be considered a superset of information from which dynamic channel maps 216 may be created. In an example, tier channel map 300 may include information on services that not all VGDs 12 a user may have are capable of rendering. For instance, tier channel map 300 may include information on high definition (HD) channels and standard definition channels (SD) of a particular tier.

Frequently, a user may have more than one VGD 12. For example, a user may have a gateway (e.g., set top box), a tablet computer (e.g., an IPAD®), and a mobile phone. Each of these VGDs may have different capabilities for rendering content. In an example, the VGDs may differ in the resolution of video they are able to display. Some may be able to present high definition video, others may only be able to present standard definition video, and some may only be able to present low definition video. To accommodate for these differences and rather than sending the entire tier channel map 300, computing device 122 may generate a dynamic channel map 216 that is tailored to the capabilities of VGDs 12. Examples of dynamic channel maps 216a-b are shown in FIG. 3 and requesting a dynamic channel map is discussed in FIG. 2.

With reference to FIG. 2, after VGD 12a is initially provisioned, VGD 12a may communicate a request 214a for a dynamic channel map 216a to the computing device 122. Request 214a may be responsive to a query or ping, such as during provisioning, or may be proactively generated, in whole or in part, by the video generation device 12a. Request 214a may be embodied in Internet Protocol (IP) data or non-IP data. Request 214a may include a device identifier and/or a user identifier to uniquely identify the user and the type of VGD that sent the request. Request 214a may also include capability information of the requesting VGD, such as, for example, the features supported by the VGD 12a. In an example, request 214a may indicate that the VDG 12a is a mobile device, HD device, or non-HD device. Also, request 214a may include information on a retailer of a device, a part number of the device, a serial number of the device, or the like, from which a device type may be assessed. This information may be included in request 214a, or, for example, request 214a may include a unique device identifier that may be matched to a device type for the VGD 12a identified by that identifier in memory 142. Upon receipt of request 214a, computing device 122 may also interact with the VGD 12a prompting the user to login or provide other identifying information. After or as part of logging in, the computing device 122 may query the VGD 12a for information on its capabilities.

Computing device 122 may process request 214a to look up the entitlements 202 associated with an account of the user stored in memory 142. The lookup may include confirmation that the requesting VGD 12a is authorized to receive a dynamic channel map 216a, such as confirmation that the requesting VGD 12a is correspondent to a paid subscriber, for example. Upon lookup, computing device 122 may match the requesting VGD 12a with the user indicated as correspondent to that VGD 12a in memory 142, and may retrieve a list of services specified in the user's account to which the requesting user is entitled to access.

Based on the capabilities information received from VGD 12 and the services to which the user is entitled to access, computing device 122 may construct a dynamic channel map 216a tailored to the services the requesting VGD 12a can render. For example, a VGD 12a that can only render SD video channels would not receive information on HD video channels. VGD 12b, also shown in FIG. 2, may similarly interact with the computing device 122 to obtain a dynamic channel map 216b.

FIG. 3 illustrates two example dynamic channel maps 216a-b in accordance with various aspects of the disclosure. Computing device 122 may generate dynamic channel maps 216a-b by filtering the tier channel map 300 based on user entitlements and device capabilities. A dynamic channel map 216a or 216b may list services the requesting VGD is capable of rendering for the tier to which the user has subscribed. In an example, computing device 122 may create a first dynamic channel map 216a for a VGD 12a that cannot render HD content, and a second dynamic channel map 216b for a VGD 12b that can render HD content. Services that are available may also include applications, documents, games, etc. If a service is only available in one format but not the other (e.g., in HD but not SD), the dynamic channel map 216a may indicate as such in the resolution column. For example, the HDNET channel may only be available in HD, and not SD, and the resolution column of the first dynamic channel map 216a may indicate that the HDNET channel is unavailable. If a service is only available in SD, and a VGD 12 can render both HD and SD, computing device 122 may include that service in the second dynamic channel map 216b and indicate its resolution. In an example, computing device 112 may generate and communicate dynamic channel maps 216a-b to different VGDs 12 based on a tier entitlement associated with the same user's account.

In addition to user entitlements and device capabilities, computing device 122 may also consider other dynamic factors when generating a dynamic channel map 216. Such other dynamic factors may include market-available sources, sources switched based on bandwidth use monitoring, sources dictated by targeting information, such as may be obtained from a user profile, or the like. By way of non-limiting example, monitoring of entitlements and device capabilities may provide metrics that allow for source selection based on bandwidth availability. More particularly, in accordance with an indication of usage by certain numbers of a particular device type, as reflected by requests 214, sources may be switched to, or become selectable from, switched digital video (SDV) channels, for example. Thereby, determining a total number of requests 214 received from different VGDs 12 may provide metrics for unicast/SDV assignment calculations, for example.

In another example, network bandwidth conditions may be a dynamic factor in generating a dynamic channel map 216. For example, computing device 122 may receive content from multiple Local Offices 120 or other content sources. If the VGD 12 is configured to stream content, computing device 122 may monitor bandwidth conditions of the network 124 between the computing device 122 and each of the Local Offices. For instance, computing device 122 may determine an amount of available bandwidth between itself and each of any applicable network nodes, which may be Local Offices or other nodes, and may store available network bandwidth parameters. Computing device 122 may exclude any Local Offices where there is insufficient available bandwidth to stream content from that Local Office. For example, content may require 5 Megabits per second (Mbps) and only 4 Mbps of bandwidth may be available to stream the content from a particular Local Office. For the remaining Local Offices, computing device 122 may select the Local Office having a highest amount of available bandwidth and include a network address for that Local Office in the dynamic channel map 216. The VGD 12 may then use the network address to access the content from the Local Office identified in the dynamic channel map 216.

In a further example, geographic location of a VGD 12 may be a dynamic factor in generating a dynamic channel map 216. For example, computing device 122 may determine a geographic location of the VGD 12 either by querying the VGD 12 or by other manners. As there may be certain geographic and timing restrictions on when content may be accessed, computing device 122 may generate the dynamic channel map 216 so that the VGD 16 may only access local sources for services.

Figure 4:
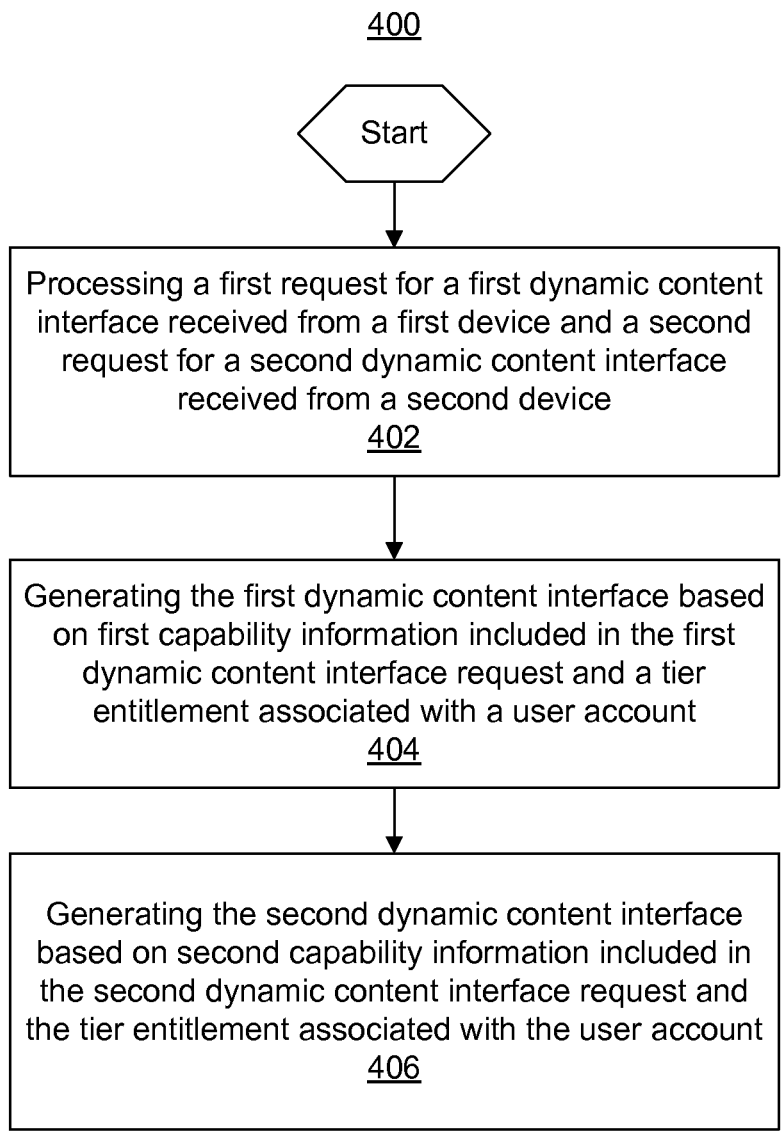
FIG. 4 is a flow diagram illustrating a method, in accordance with various aspects of the disclosure.

FIG. 4 is a flow diagram illustrating a method 400 of generating a dynamic content interface, in accordance with various aspects of the disclosure. The method may be implemented by computing device 122, or other apparatus or computing device. The steps identified in each block in the flow diagram may be omitted or repeated one or more times. The method may also repeat one or more times, as desired, in whole or in part. Also, the method may include blocks and steps other than the ones depicted.

At block 402, a computing device may process a first request for a first dynamic content interface received from a first VGD and a second request for a second dynamic content interface received from a second VGD, wherein the first and second VGDs are associated with a user account. In an example, computing device 122 may receive a dynamic channel map request 216a from VGD 12a and a dynamic channel map request 216b from VGD 12b. Both VGDs 12a-b may be associated with the same user, and hence with the same account of the user stored by memory 142.

At block 404, a computing device may generate the first dynamic content interface based on first capability information included in the first dynamic content interface request and a tier entitlement associated with the user account. In an example, computing device 122 may generate channel map 216a based on capability information received in request 216a and a tier entitlement associated with the user account.

At block 406, a computing device may generate the second dynamic content interface based on second capability information included in the second dynamic content interface request and the tier entitlement associated with the account, wherein a service identified in both the first and second dynamic content interfaces is assigned a same virtual channel in each of the content interfaces. In an example, computing device 122 may generate channel map 216b based on capability information received in request 216b. Computing device 122 may assign a same virtual channel to a service included in both channel maps 216a-b. The flow diagram may then end or return to any of the preceding blocks.

The example embodiments for dynamic content interface generation thus allow providers, such as MSOs, to deliver different content interfaces to different devices based on capabilities of a requesting video generation device and entitlements of a user. Thereby, the example embodiments for dynamic content interface generation simplify the maintenance of content interfaces for different provisioning systems, additionally allowing simplified support for alternative VGDs with distinct features, and additionally readily provides for the addition of, or modification of, available channels, such as newly available HD channels. For example, as new devices become capable of displaying video in newly available formats, such as low resolution MPEG4 format being provided for mobile devices, dynamic content interface generation delivers the appropriate content interface, identifying appropriate video sources, based on capabilities of the device and user entitlements.

Those of ordinary skill in the art will recognize that many modifications and variations of the disclosure may be implemented without departing from its spirit or scope. Thus, it is intended that the disclosure cover the modifications and variations that come within the scope of the appended claims and their equivalents.

What is claimed is:

1. A method comprising:
   determining, at a computing device, an amount of bandwidth required to stream a service;
   determining a plurality of sources for the service;
   determining that an amount of available bandwidth associated with a first source, of the plurality of sources, is less than the amount of bandwidth required to stream the service;
   responsive to a first request received at the computing device, filtering a tier channel map to generate a first dynamic channel map based on capability information associated with a first device and a tier entitlement associated with a user account, wherein the filtering further comprises excluding a first network address associated with the first source for the service from the first dynamic channel map; and
   sending, from the computing device, the first dynamic channel map to the first device, wherein the first dynamic channel map is configured to enable the first device to access the service from one or more other sources of the plurality of sources different from the first source.

2. The method of claim 1, further comprising:
   responsive to a second request received at the computing device, filtering the tier channel map to generate a second dynamic channel map based on capability information associated with a second device and the tier entitlement associated with the user account; and
   sending, from the computing device, the second dynamic channel map to the second device.

3. The method of claim 2,
   wherein the filtering the tier channel map to generate the first dynamic channel map further comprises assigning a particular service in the first dynamic channel map to a particular virtual channel,
   wherein filtering the tier channel map to generate the second dynamic channel map further comprises assigning the particular service in the second dynamic channel map to the particular virtual channel, the method further comprising:
   providing the service to the first device in a high definition format in response to a selection by the first device of the particular virtual channel; and
   providing the service to the second device in a standard definition format in response to a selection by the second device of the particular virtual channel.

4. The method of claim 1, wherein the filtering the tier channel map to generate the first dynamic channel map further comprises including an identification of at least one of a game, an application, a document, and a channel.

5. The method of claim 1, wherein the filtering the tier channel map to generate the first dynamic channel map further comprises including a second network address associated with a second source for the service of the plurality of sources for the service in the first dynamic channel map based at least in part on available network bandwidth parameters.

6. The method of claim 1, wherein the capability information associated with the first device indicates that the first device is one of high-definition enabled, standard definition enabled, and a mobile device.

7. The method of claim 1, further comprising processing the first request to determine that the first device is authorized to receive the service.

8. The method of claim 1, wherein the filtering the tier channel map to generate the first dynamic channel map further comprises including in the first dynamic channel map a video channel lineup corresponding to a plurality of content creators.

9. The method of claim 2,
   wherein the filtering the tier channel map to generate the first dynamic channel map further comprises including in the first dynamic channel map a second service available in a high definition format and a third service available in a standard definition format, and wherein the second dynamic channel map only includes services in the standard definition format.

10. The method of claim 1, wherein the computing device is independent of a set-top box.

11. The method of claim 1, wherein the computing device is an edge server.

12. The method of claim 1, further comprising:
including in the first dynamic channel map a second network address associated with a second source for the service of the plurality of sources for the service, wherein the second source has a highest amount of available bandwidth relative to other sources of the plurality of sources for the service.

13. The method of claim 1, wherein the first network address associated with the first source enables access to a data stream associated with the first source.

14. A method comprising:
determining, at a computing device, an amount of bandwidth required to stream a service;
identifying a plurality of sources for the service;
determining that an amount of available bandwidth associated with a first source, of the plurality of sources, is insufficient to stream the service from the first source based on the amount of bandwidth required to stream the service;
filtering, at the computing device, a tier channel map to generate a first dynamic channel map for a first device based on capability information associated with the first device and a tier entitlement associated with a user account, wherein the filtering further comprises excluding a network address associated with the first source for the service from the dynamic channel map; and
sending, from the computing device, the first dynamic channel map to the first device, wherein the first dynamic channel map is configured to enable the first device to access the service from one or more other sources of the plurality of sources different from the first source.

15. The method of claim 14, further comprising:
filtering the tier channel map to generate a second dynamic channel map for a second device based on capability information associated with the second device and the tier entitlement associated with the user account;
identifying a particular service in the first dynamic channel map and identifying the particular service in the second dynamic channel map;

assigning a virtual channel to the particular service identified in the first dynamic channel map and assigning the virtual channel to the particular service identified in the second dynamic channel map; and
sending, from the computing device, the second dynamic channel map to the second device.

16. A method comprising:
filtering, at a computing device, a tier channel map to generate a first dynamic channel map and a second dynamic channel map, wherein the first dynamic channel map is based on capability information associated with a first device included in a first dynamic channel map request and a tier entitlement associated with a user account, wherein the second dynamic channel map is based on capability information associated with a second device included in a second dynamic channel map request and the tier entitlement associated with the user account, wherein the filtering the tier channel map to generate the first dynamic channel map further comprises excluding a network address associated with a first source for a service from the first dynamic channel map in response to determining that there is insufficient bandwidth to stream the service from the first source;
sending, from the computing device, the first dynamic channel map to the first device, wherein the first dynamic channel map is configured to enable the first device to access the service from a second source different from the first source; and
sending, from the computing device, the second dynamic channel map to the second device, wherein the second dynamic channel map is configured to enable the second device to access the service.

17. The method of claim 16, wherein the computing device is independent of a set-top box.

18. The method of claim 16, further comprising assigning a virtual channel to a particular service identified in the first dynamic channel map and assigning the virtual channel to the particular service identified in the second dynamic channel map.

19. The method of claim 16, further comprising:
including in the first dynamic channel map a different network address associated with the second source for the service, wherein the second source has a highest amount of available bandwidth relative to other sources for the service.

20. The method of claim 16, wherein the network address associated with the first source enables access to a data stream associated with the first source.

\* \* \* \* \*

UNITED STATES PATENT AND TRADEMARK OFFICE
CERTIFICATE OF CORRECTION

| | | |
|---|---|---|
| PATENT NO. | : 8,935,726 B2 | Page 1 of 1 |
| APPLICATION NO. | : 13/469860 | |
| DATED | : January 13, 2015 | |
| INVENTOR(S) | : Mehul Patel et al. | |

It is certified that error appears in the above-identified patent and that said Letters Patent is hereby corrected as shown below:

In the specification

Column 6, Detailed Description, Line 64:
Please delete "16" and insert --12--

Signed and Sealed this
Thirteenth Day of October, 2015

Michelle K. Lee
*Director of the United States Patent and Trademark Office*